(No Model.)

J. W. DUFFEE & C. WESTON.
FLOWER STAND.

No. 379,637. Patented Mar. 20, 1888.

Witnesses.
L. F. Gardner
Edm. P. Ellis

Inventors
Jas. W. Duffee,
Chas. Weston,
per F. A. Lehmann,
Atty.

United States Patent Office.

JAMES W. DUFFEE AND CHARLES WESTON, OF WASHINGTON COURT-HOUSE, OHIO.

FLOWER-STAND.

SPECIFICATION forming part of Letters Patent No. 379,637, dated March 20, 1888.

Application filed December 6, 1887. Serial No. 257,122. (No model.)

*To all whom it may concern:*

Be it known that we, JAMES W. DUFFEE and CHARLES WESTON, of Washington Court-House, in the county of Fayette and State of Ohio, have invented certain new and useful Improvements in Flower-Stands; and we do hereby declare the following to be a full, clear, and exact description of the invention, such as will enable others skilled in the art to which it pertains to make and use it, reference being had to the accompanying drawings, which form part of this specification.

Our invention relates to an improvement in flower-stands; and it consists in the combination of the frame-work which forms a support for the flower-stand, and in which a chamber is formed to receive a lighted lamp during cold weather, the top of the chamber being perforated, so as to allow the heat to escape up around the flowers, and drop-sides which are attached to the frame, and which can be opened up vertically around the top edges of the supporting-frame, so as to confine the rising currents of heated air, as will be more fully described hereinafter.

The objects of our invention are to form in the frame upon which the flower-stand is supported a warm-air chamber, from which during cold weather the heated air escapes and rises around the flowers, so as to prevent them from being injured by the cold, and to provide this frame having the warm-air chamber with drop-sides which can be raised, so as to confine the rising currents of warm air directly around the flower stand.

Figure 1:
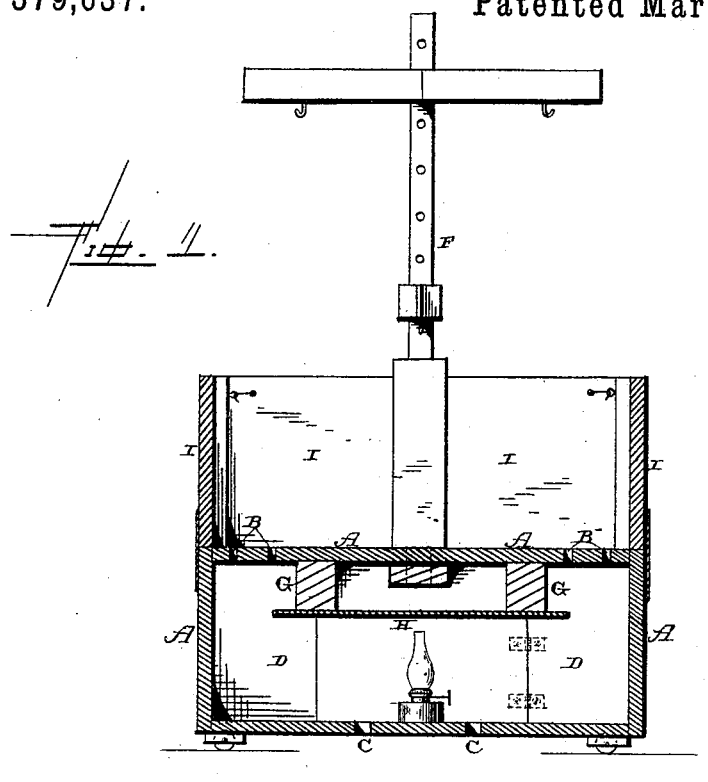
Figure 2:
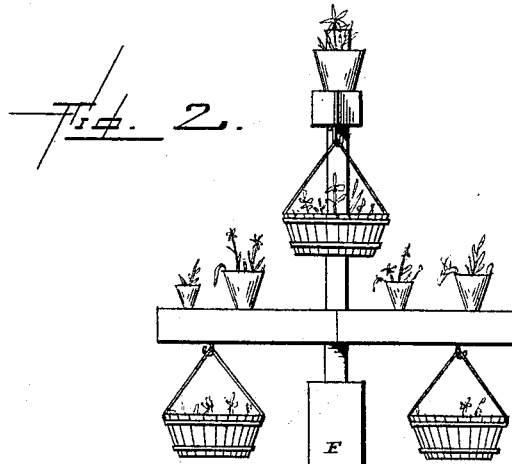

Figure 1 is a vertical section of a flower-stand embodying our invention, taken to one side of the center and showing the drop-sides raised. Fig. 2 is a similar view showing the drop-sides lowered.

A represents a suitable box-like frame-work, which is mounted upon rollers, so as to be freely moved around, and which has perforations C through its bottom to admit fresh air, and perforations B through its top to allow the warm air to escape. In the warm-air chamber D, which is formed in the frame, a lamp is to be placed during cold weather, so as to heat the air in the chamber, and this air heated by the lamp, rising through the openings B around the plants upon the flower-stand F, will protect the plants from injury during cold weather. In order to prevent the frame from catching on fire from the heat of the lamp, the cross-timbers G are secured to the under side of the perforated top, and covering the lower edges of these cross-timbers is a metallic plate, H, against which the heat from the lamp strikes, and is evenly diffused throughout the chamber. These cross-timbers, the top of the frame, and the sheet-iron form a dead-air chamber, which renders it impossible for the lamp to set the frame on fire or to cause the top of the frame to warp or crack. The perforations B through the top of the frame are arranged around its outer edges, so that the heated air in rising will come in direct contact with the flower-pots placed upon the flower-stand, and thus prevent the flowers from being injured by the cold during severe weather.

Secured to each edge of the frame A is a drop-side, I, which is hinged at its upper edge to the top edge of the frame A, and which, when not needed during warm weather, drops down against the side of the frame A, as shown in Fig. 1. During very cold weather, when it is desirable to confine the rising currents of warm air directly around the plants, these sides are raised, so as to form a box-like inclosure around the top edges of the frame A, and thus prevent the warm air from being dissipated by drafts or from other causes. Two of these drop-sides are provided with cleats, which not only brace the sides to which they are applied, but serve as stops for the ends of the other sides to strike against. The lamp is inserted in the frame through a suitable opening made in one side. When so desired, a vessel or vessels containing water may be placed in this chamber, so that the heated air will take up moisture, and thus carry it to the plants.

The top of the frame forms a very convenient place upon which to place flower-pots and other such articles. The drop-sides hang down out of the way when not in use, and are scarcely noticeable. Any form of flower-stand preferred may be placed upon the top of the frame. When the flower-pots are not in use, they may be stored away in the warm-air chamber for safe-keeping.

Having thus described our invention, we claim—

1. The combination of a flower-stand with a box-like frame, which forms a support for the stand and has both its top and bottom perforated to allow a free passage of air through the chamber, a heating device to be placed in the chamber, the cross-timbers G, and the sheet-metal plate H, substantially as shown.

2. The combination of a flower-stand with a box-like frame, which forms a support for the stand and which is adapted to receive a heating device, and has both its top and bottom perforated to allow a free passage of air through the chamber, substantially as described.

3. The combination of a flower-stand, the box-like perforated frame upon which the flower-stand is placed, and which is adapted to receive a heating device, with sides which can be raised around the edges of the frame, so as to confine the currents of heated air around the plants, substantially as set forth.

In testimony whereof we affix our signatures in presence of two witnesses.

JAMES W. DUFFEE.
CHARLES WESTON.

Witnesses:
THOS. W. MARCHANT,
ORTON A. SPERRY.